United States Patent
Brammer et al.

[11] Patent Number: 5,872,307
[45] Date of Patent: Feb. 16, 1999

[54] VIBRATION PICK-UP WITH PRESSURE SLEEVE

[75] Inventors: Hartmut Brammer, Vaihingen; Uwe Hackel, Gerlingen; Holger Krebs, Erdmannhausen; Manfred Schuetzmeier, Immenstadt, all of Germany

[73] Assignee: Robert Bosch GmbH, Stuttgart, Germany

[21] Appl. No.: 675,856

[22] Filed: Jul. 5, 1996

[30] Foreign Application Priority Data

Jul. 3, 1995 [DE] Germany .................. 195 24 150.9
Mar. 29, 1996 [DE] Germany .................. 196 12 540.5

[51] Int. Cl.$^6$ .................................................. G01L 23/22
[52] U.S. Cl. ........................................... 73/35.11; 73/654
[58] Field of Search ................................. 73/35.11, 654; 310/329

[56] References Cited

U.S. PATENT DOCUMENTS

| | | | |
|---|---|---|---|
| 4,944,179 | 7/1990 | Komurasaki | 73/35.11 |
| 4,949,571 | 8/1990 | Komurasaki | 73/35.11 |
| 4,967,114 | 10/1990 | Komurasaki | 73/35.11 |
| 5,398,540 | 3/1995 | Entenmann | 73/35.11 |
| 5,440,933 | 8/1995 | Brammer | 73/35.11 |

FOREIGN PATENT DOCUMENTS

| | | |
|---|---|---|
| 0211019 | 4/1989 | European Pat. Off. . |
| 440360 | 10/1994 | Germany . |

*Primary Examiner*—Christine K. Oda
*Attorney, Agent, or Firm*—Michael J. Striker

[57] ABSTRACT

A vibration pick-up with a pressure sleeve is mounted by a mounting element extending through a central opening of the pressure sleeve. The pressure sleeve is clamped with an abutment surface on a component which causes vibrations. A threaded ring with a spring or a welded spring provided on the pressure sleeve holds a seismic mass under the pressure of the spring, and a detection element formed for example as a piezo-ceramic disk is arranged. The pressure sleeve has extensions with depressions which, in combination with a flanged insertion disk, form a seal labyrinth.

24 Claims, 3 Drawing Sheets

VIBRATION PICK-UP WITH PRESSURE SLEEVE

BACKGROUND OF THE INVENTION

The present invention relates to a vibration pick-up with a pressure sleeve.

Vibration pick-ups with pressure sleeves are known in the art. One of such vibration pick-ups is disclosed for example in the German Patent Document DE-OS 44 03 660. The vibration pickup with the pressure sleeve of this reference is used for knocking sensors in internal combustion engines. The vibration pick-up is mounted fixedly through a mounting region on the component whose vibrations must be detected. The vibrations to be detected are knocking noises of the internal combustion engine during the operation, which are transmitted through the pressure sleeve to a piezo-ceramic detector and converted into an evaluatable output signal of a vibration pick-up operating as a knocking sensor. The type of placing or clamping the detector in the pressure sleeve and the mounting on the vibrating component has a great influence both on the manufacturing process as well as on the eventual error measurements and disturbances in the connected evaluating circuit during the operation.

The known pressure sleeves of the vibration pick-ups are composed, as a rule, of a very resistant and hard material such as for example steel to withstand the relatively high pressure and temperature fluctuations to provide correct measurements. The housing accommodating the pressure sleeve and the detector together with its clamping means is composed as a rule of a synthetic plastic material, such as for example polyurethane (PUR) or glass-fiber-rainforest polyamide (PA66 GF35). It is known from the European Patent Document EP 0 211 019 B1 to connect these parts firmly with one another by correspondingly designed threaded constructions and in some cases through seal labyrinths so that these connections are not substantially affected by temperature actions.

SUMMARY OF THE INVENTION

Accordingly, it is an object of the present invention to provide a vibration pick-up of the above mention general type, which is a further improvement of the existing vibration pick-ups.

In keeping with these objects and with others which will become apparent hereinafter, one feature of the present invention resides, briefly stated, in a vibration pick-up with a pressure sleeve and detection means abutting against a projection of the pressure sleeve as well as a synthetic plastic housing arranged around the pressure sleeve, wherein in accordance with the present invention at least one circumferential extension is provided on a periphery of the projection, which together with the synthetic plastic material of the housing, forms a labyrinth seal. The vibration pick-up in accordance with the present invention has the advantage that the pressure sleeve which is composed, for example of metal, forms by a radial extension arranged on the lower projection a seal labyrinth which during injection molding of the pressure sleeve, for example with polyurethane or polyamide, is filled with this synthetic plastic material.

The synthetic plastic material surrounds also the extension or the axial depressions in the extension, in accordance with further embodiments of the present invention, on the periphery of the pressure sleeve. After hardening, it provides a tight closure between the housing and the pressure sleeve. Since in many instances of the application of the vibration pick-ups, for example, as knocking sensors for internal combustion engines, there is a danger that the aggressive fluids can penetrate into the housing, a good sealing is very important. Also during this applications there are high temperature fluctuations which can lead to formation of gaps between the housing and the metallic pressure sleeve in the case of different expansion coefficients. In accordance with the present invention, these phenomena are simply prevented by a synthetic plastic layer which forms a seal labyrinth around the extensions.

In accordance with a further feature of the present invention, a seal labyrinth on the lower projection of the pressure sleeve can be formed by a hollow-cylindrical, downwardly flanged insertion disk. A combination of the insertion disk with the extension on the projection of the pressure sleeve is also possible and provides for highly advantages results for sealing of the pressure sleeve.

In accordance with a further embodiment of the present invention, the vibration pick-up in the region over the clamping of the detection means also has a seal labyrinth so that here the synthetic plastic housing of the pressure sleeve is closed firmly and tightly. In this case the pressure sleeve can be produced in a simple manner as an extruded part, since it is not necessary to provide material removing machining for threads. The abutment for the clamping of the detection means and this embodiment is formed so that the spring is welded with the pressure sleeve, for example by laser welding.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
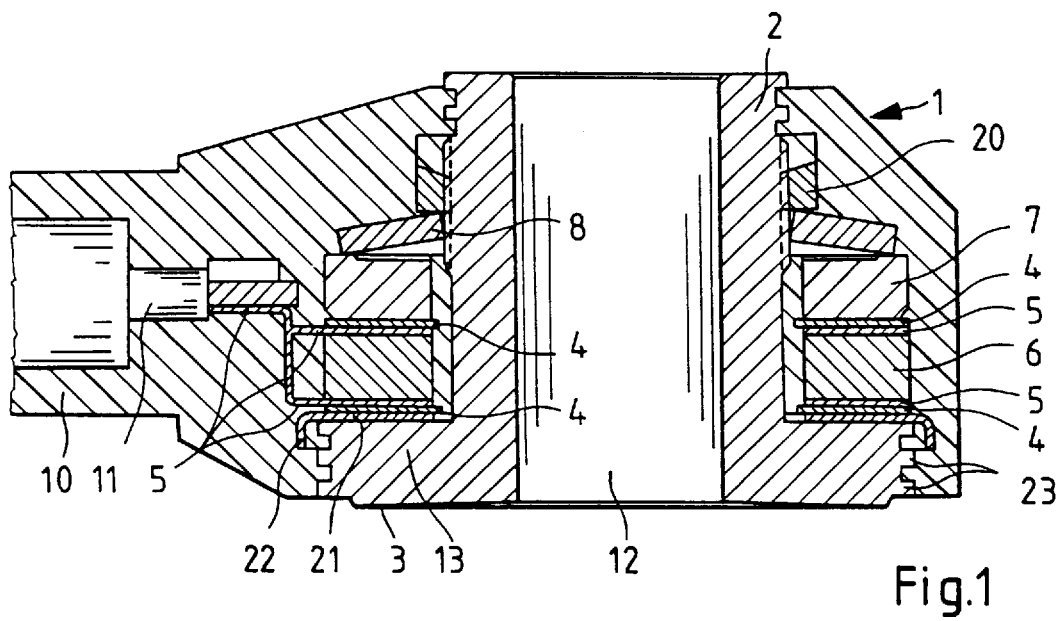
FIG. 1 is a view showing a longitudinal section of vibration pick-up in accordance with the present invention with a pressure sleeve having circumferential projections and an insertion disk.

A vibration pick-up shown in FIG. 1 is used as a knocking sensor for an internal combustion engine. It has a housing 1 and a pressure sleeve 2 located in the housing. The pressure sleeve 2 abuts with its lower abutment surface 3 on a not shown housing of a motor whose vibrations must be detected. A plurality of parts are arranged on the outer periphery of the pressure sleeve 2, starting from the lower abutment surface 3. These parts include an insulating disk 4, a contact disk 5, a piezo-ceramic disk 6 which forms detecting means, a second contrast disk 5 and a second insulating disk 4. A seismic mass 7 is arranged on the above described arrangement. Together with a plate spring 8 and a threaded ring 20 screwed over it, the seismic mess produces a prestress in direction of the seismic mass 7 and the piezo-electric disk 6.

An insertion disk 21 is arranged between the lower contact disk 5 and a projection 13 of the pressure sleeve 2. The insertion disk is drawn or flanged over the whole periphery to form a part 22, so that together with the periphery of the pressure sleeve a seal labyrinth is formed on the projection 13. The contact disk 4 can be also formed as one-piece integral part with the insertion disk 21. Circumferential extensions 23 are further provided on the periphery of the projection 13.

A housing 1 is composed of a synthetic plastic material, for example polyurethane [PUR] or glass-fiber-reinforced polyamide [PA66 GF35] and produced by injection molding. It has an integrated closure part 10 in which a connecting cable 11 is injected. The conductors of the connecting cable 11 are connected with both contact disks 5 at both sides of the piezo-ceramic disk 6 and transmit the electric voltage which is produced when the piezo-ceramic disk 6 is subjected to a pressure loading. A not shown mounting screw extends through a central recess or a bore 12 in the pressure sleeve 2. The mounting sleeve mounts the knocking sensor directly or indirectly on the housing of the internal combustion engine.

During the mounting of the knocking sensor, the total force applied from the mounting screw is transmitted to the pressure sleeve 2. In other words, no force acts on the piezo-ceramic disk 6 during the mounting. The required prestress force is produced thereby in that, by the screwing with the threaded ring 20 the whole arrangement of the part 4–7 is pressed against a projecting region 13 of the pressure sleeve 2 and the important parts of the whole vibration pick-up are held in their initial position.

The prestress force is selected so that the axial forces are effective on the piezo-ceramic disk 6 without remaining worsening of its electrical signal and they are substantially independent from thermal expansions as well as unavoidable straining of the pressure sleeve 2 during mounting. The pulses provided by the seismic mass 7 and proportional to the vibrations of the internal combustion engine are converted in the piezo ceramic disk 6 into voltage pulses. These voltage pulses are readable by a corresponding measuring device or transmitted further to a control device.

Figure 2:
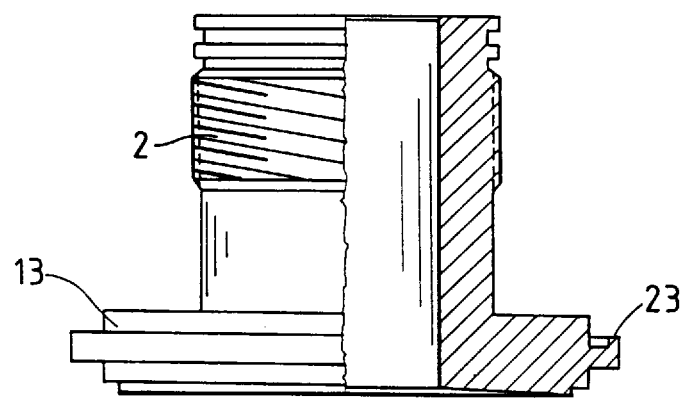
FIG. 2 is a view showing a section of the inventive pick-up taken through the pressure sleeve, in detail.
Figure 3:
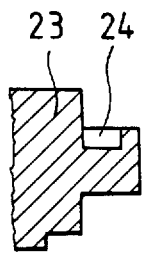
FIGS. 3–5 are views showing the projections of the inventive vibration pick-up in various embodiments.
Figure 4:
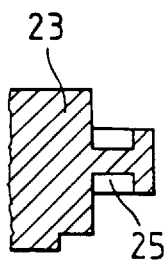
Figure 5:
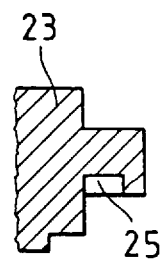

FIG. 2 shows a section through the pressure sleeve 2 which clearly illustrates the extensions 23 on the projection 13. FIG. 3 shows an axial depression 24 in the extension 23 on its upper side. FIG. 4 shows, in addition to the depression 24 on the upper side, also an axial depression 25 on the lower side of the extension 23. Finally, FIG. 5 shows the axial depression 25 only on the lower side of the extension 23.

Figure 6A:
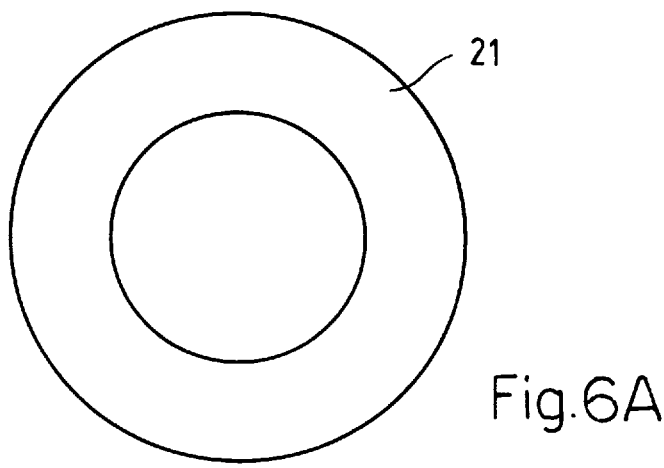
FIGS. 6a and 6b are a plan view and a side view of the insertion disk in detail.
Figure 6B:
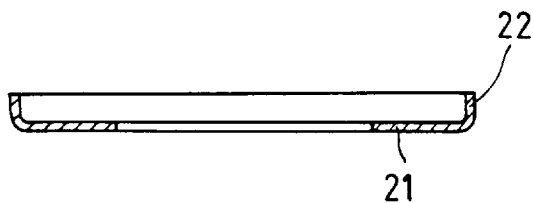

FIGS. 6a and 6b show a plan view and a side view of the insertion disk 21. As can be seen from FIG. 6b, the insertion disk 21 has a downwardly flanged portion 22.

When during the extrusion coating of the pressure sleeve 2 for producing the housing 1 the synthetic plastic mass flows on the periphery of the pressure sleeve 2 and in some cases between the part 2 of the insertion disk 21 and the periphery of the pressure sleeve 2, it forms a seal labyrinth which guarantees an efficient sealing of the whole arrangement held together with the threaded ring 20. Expansion differences caused by temperature fluctuations do not lead to disturbing formations of gaps through which moisture can penetrate, because of the provision of the labyrinths joint, in particular with the axial depressions 24 and 25 on the extension 23.

Figure 7:
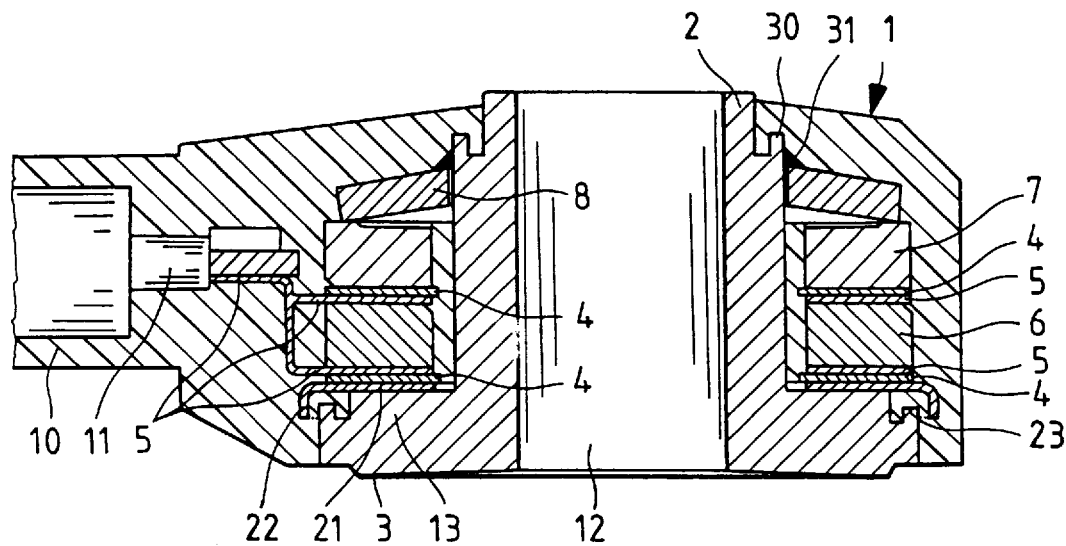
FIGS. 7 and 8 are views showing a longitudinal section through the vibration pick-up and a pressure sleeve with a laser-welded spring.
Figure 8:
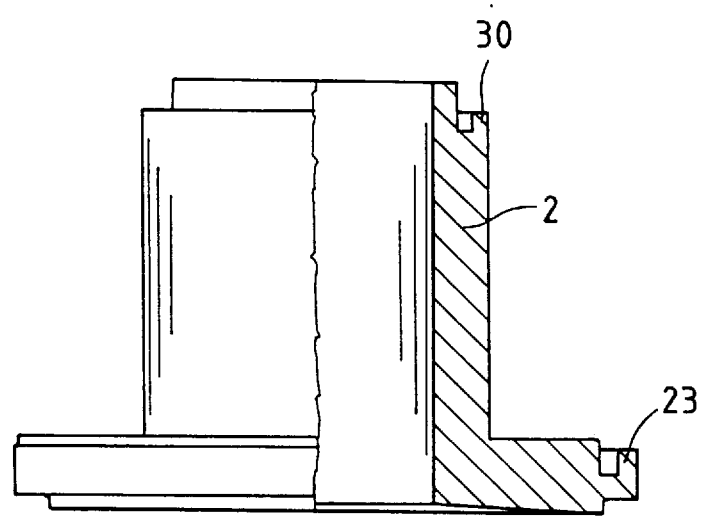

A vibration pick-up in accordance with FIG. 7 has a pressure sleeve 2 with an extension 30. The extension 30 is located over the abutment for the detecting means 6 and, after the coating with synthetic plastic material, forms with its inwardly located depression a seal labyrinth in the same manner as described hereinabove. In this embodiment the spring 8 is laser-welded with the pressure sleeve 2 by a welding seam 31, so as to form the abutment for the detection means 6.

The sectional illustration in FIG. 2 shows a special design of the pressure sleeve 2 with the seal labyrinth at the extensions 23 and 30. Because of the simple design and the absence of threads for not needed threaded rings, the pressure sleeve 2 can be produced by extrusion.

It will be understood that each of the elements described above, or two or more together, may also find a useful application in other types of constructions differing from the types described above.

While the invention has been illustrated and described as embodied in vibration pick-up with pressure sleeve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vibration pick-up, comprising a pressure sleeve having a central opening for a mounting element and an abutment surface so that said pressure sleeve is placeable on a vibrating component with said abutment surface and is clamped by the mounting element extending through said central opening; detection means arranged radially outwardly on said pressure sleeve with an axial prestress; a seismic mass provided on said pressure sleeve and held under a spring pressure, said pressure sleeve having a projection against which said seismic mass and said detection means abut; a synthetic plastic housing arranged around said pressure sleeve, said projection having a periphery provided with at least one circumferential extension which together with the synthetic plastic material of said housing forms a labyrinth seal.

2. A vibration pick-up as defined in claim 1; and further comprising a threaded ring forming an abutment; and a spring which holds said seismic ring in abutment against said threaded ring.

3. A vibration pick-up as defined in claim 1, wherein said extension has at least one peripheral axial depression facing said detection means.

4. A vibration pick-up as defined in claim 1, wherein said extension has at least one peripheral axial depression at a side facing away from said detection means.

5. A vibration pick-up as defined in claim 1, and further comprising an insertion disk arranged between said detection means and said projection, said insertion disk being formed radially outwardly as a hollow cylinder extending over a peripheral surface of said projection at a distance from said peripheral surface it and together with said synthetic plastic material of said housing forming an labyrinth seal.

6. A vibration pick-up as defined in claim 5; and further comprising a contact disk, said insertion disk and said contact disk together forming a one-piece component.

7. A vibration pick-up as defined in claim 1, wherein said pressure disk is composed of metal.

8. A vibration pick-up as defined in claim 1, wherein said synthetic plastic material of said housing is polyurethane.

9. A vibration pick-up as defined in claim 1, wherein said synthetic plastic material of said housing is a glass-fiber-reinforced polyamide.

10. A vibration pick-up as defined in claim 1, wherein said detection means is a piezo-ceramic disk.

11. A vibration pick-up, comprising a pressure sleeve having a central opening for a mounting element and an abutment surface so that said pressure sleeve is placeable on a vibrating component with said abutment surface and is clamped by the mounting element extending through said central opening; detection means arranged radially outwardly on said pressure sleeve with an axial prestress; a seismic mass provided on said pressure sleeve and held under a spring pressure, said pressure sleeve having a projection against which said seismic mass and said detection means abut; a synthetic plastic housing arranged around said pressure sleeve; and an insertion disk arranged between said detection means and said projection, said insertion disk being formed radially outwardly as a hollow cylinder extending over a peripheral surface of said projection at a distance from said peripheral surface it and together with these synthetic plastic material of said housing forming a labyrinth seal.

12. A vibration pick-up as defined in claim 11, wherein said pressure disk is composed of metal.

13. A vibration pick-up as defined in claim 11, wherein said synthetic plastic material of said housing is polyurethane.

14. A vibration pick-up as defined in claim 11, wherein said synthetic plastic material of said housing is a glass-fiber-reinforced force polyamide.

15. A vibration pick-up as defined in claim 11, wherein said detection means is a piezo-ceramic disk.

16. A vibration pick-up, comprising a pressure sleeve having a central opening for a mounting element and an abutment surface so that said pressure sleeve is placeable on a vibrating component with said abutment surface and is clamped by the mounting element extending through said central opening; detection means arranged radially outwardly on said pressure sleeve with an axial prestress; a seismic mass provided on said pressure sleeve and held under a spring pressure, said pressure sleeve having a projection against which said seismic mass and said detection means abut; a synthetic plastic housing arranged around said pressure sleeve, said projection having a periphery provided with at least one circumferential extension which together with the synthetic plastic material of said housing forms a labyrinth seal; an abutment provided on said pressure sleeve; and a spring holding said seismic mass so that said seismic mass abuts against said abutment, said abutment being formed as a spring which is provided on a periphery of said pressure sleeve.

17. A vibration pick-up as defined in claim 16; a further comprising means for mounting said spring on said pressure sleeve and including a laser-welding seam.

18. A vibration pick-up as defined in claim 16, wherein said pressure sleeve is an extrusion-formed pressure sleeve.

19. A vibration pick-up as defined in claim 16, wherein said synthetic plastic material of said housing is polyurethane.

20. A vibration pick-up as defined in claim 16, wherein said synthetic plastic material of said housing is a glass-fiber-reinforced polyamide.

21. A vibration pick-up as defined in claim 16, wherein said detection means is a piezo-ceramic disk.

22. An internal combustion engine, comprising a motor block which forms a component causing vibrations, and a vibration pick-up form picking up the vibrations of said component, said vibration pick-up including a pressure sleeve having a central opening for a mounting element and an abutment surface so that said pressure sleeve is placeable on a vibrating component with said abutment surface and is clamped by the mounting element extending through said central opening, detection means arranged radially outwardly on said pressure sleeve with an axial prestress, a seismic mass provided on said pressure sleeve and held under a spring pressure, said pressure sleeve having a projection against which seismic mass and said detection means abut, a synthetic plastic housing arranged around said pressure sleeve, said projection having a periphery provided with at least one circumferential extension which together with the synthetic plastic material of said housing forms a labyrinth seal.

23. An internal combustion engine, comprising a motor block forming a component which causes vibrations; and a vibration pick-up for picking up the vibrations of said component, said vibration pick-up including a pressure sleeve having a central opening for a mounting element and an abutment surface so that said pressure sleeve is placeable on a vibrating component with said abutment surface and is clamped by the mounting element extending through said central opening, detection means arranged radially outwardly on said pressure sleeve with an axial prestress, a seismic mass provided on said pressure sleeve and held under a spring pressure, said pressure sleeve having a projection against which said seismic mass and said detection means abut, a synthetic plastic housing arranged around said pressure sleeve, and an insertion disk arranged between said detection means and said projection, said insertion disk being formed radially outwardly as a hollow cylinder extending over a peripheral surface of said projection at a distance from said peripheral surface and together with these synthetic plastic material of said housing forming labyrinth seal.

24. An internal combustion engine, comprising a motor block forming a component which caused vibrations; and a vibration pick-up which picks up the vibrations of said component, said vibration pick-up including a pressure sleeve having a central opening for a mounting element and an abutment surface so that said pressure sleeve is placeable on a vibrating component with said abutment surface and is clamped by the mounting element extending through said central opening, detection means arranged radially outwardly on said pressure sleeve with an axial prestress, a seismic mass provided on said pressure sleeve and held under a spring pressure, said pressure sleeve having a projection against which said seismic mass and said detection means abut, a synthetic plastic housing arranged around said pressure sleeve, said projection having a periphery provided with at least one circumferential extension which together with the synthetic plastic material of said housing forms a labyrinth seal, an abutment provided on said pressure sleeve, and a spring holding said seismic mass so that said seismic abuts against said abutment, said abutment being formed as a spring which is provided on a periphery of said pressure sleeve.

* * * * *